United States Patent [19]

Francisco

[11] 4,021,627
[45] May 3, 1977

[54] SELF-CLEANING ELECTRICAL CONTACT FOR GAGES

[75] Inventor: James R. Francisco, Tulsa, Okla.

[73] Assignee: Frank W. Murphy Manufacturer, Inc., Tulsa, Okla.

[22] Filed: Oct. 24, 1975

[21] Appl. No.: 625,388

[52] U.S. Cl. .............................. 200/56 R; 200/241; 200/267; 200/283
[51] Int. Cl.² ................... G01D 13/26; H01H 1/00
[58] Field of Search ............... 200/56 R, 56 A, 240, 200/241, 242, 246, 283, 164 R, 238, 239, 263, 267

[56] References Cited

UNITED STATES PATENTS

| | | | |
|---|---|---|---|
| 1,879,349 | 9/1932 | Lederer | 200/241 |
| 2,839,626 | 6/1958 | Knudsen | 200/56 R |
| 3,002,074 | 9/1961 | Eadie, Jr. | 200/241 |
| 3,042,840 | 7/1962 | Eadie, Jr. | 200/56 R X |
| 3,114,903 | 12/1963 | Murphy et al. | 200/56 R X |
| 3,157,755 | 11/1964 | Hammond et al. | 200/56 R |
| 3,570,931 | 5/1971 | Murphy et al. | 200/241 |
| 3,586,799 | 6/1971 | Murphy, Jr. | 200/56 R |

Primary Examiner—James R. Scott
Attorney, Agent, or Firm—D. Paul Weaver

[57] ABSTRACT

A self-cleaning or wiping switch contact for use on machinery monitoring gages embodies a spring contact arm mounted directly on the gage movable pointer for wiping coaction with either high or low adjustable set contacts of the gage.

2 Claims, 5 Drawing Figures

SELF-CLEANING ELECTRICAL CONTACT FOR GAGES

BACKGROUND OF THE INVENTION

Self-cleaning electrical switch contacts for gages are known in the art as exemplified by U.S. Pat. No. 3,578,931 and others.

The objective of this invention to improve on the prior art through the provision of a self-cleaning or wiping contact which is less expensive to manufacture and install in a gage mechanism and which will assure a wiping or cleaning action even when applied to the movable pointer of a gage operating over a very low pressure range. In such conditions, the invention will still produce a significant wiping contact between the pointer-mounted spring contact arm and the relatively stationary contact pin of either a high or low limit set contact of the gage. The invention is suitable for use on gages which must operate in very hostile environments as are found in fertilizer plants, cement plants and certain engine rooms.

A unique feature of the invention contributing to its simplicity, compactness and economy lies in the fact that companion spring wiper arms can be formed from an initially flat metal blank which, after bending, can be conveniently attached to the driven pointer of a gage in such a manner that reliability of operation is assured under all conditions.

Other features and advantages of the invention will become apparent during the course of the following description.

BRIEF DESCRIPTION OF DRAWING FIGURES

DETAILED DESCRIPTION

Figure 1:
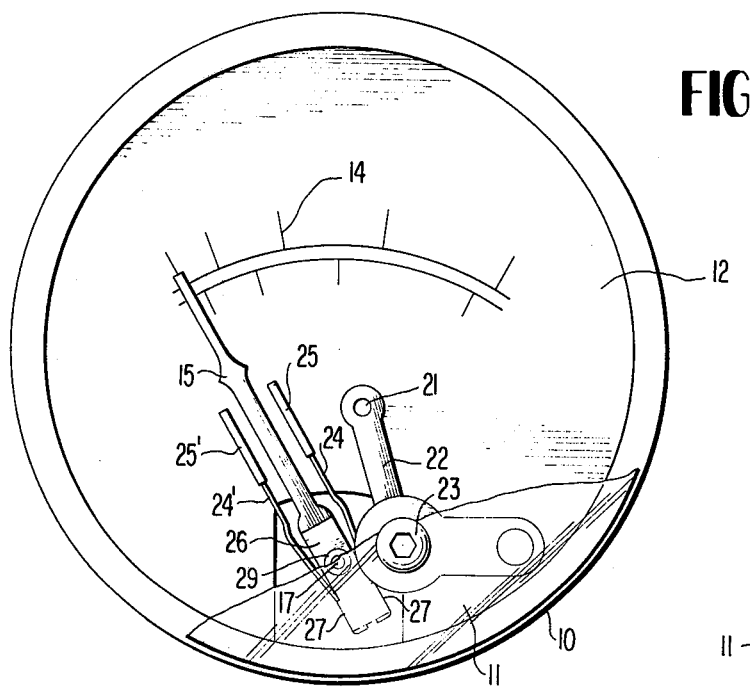
FIG. 1 is a front elevational or face view of a gage on which the invention is employed.

Referring to the drawings in detail, wherein like numerals designate like parts, the numeral 10 designates a gage housing having a transparent lens 11 fitted within its forward open side, there being a dial or face plate 12 inwardly of the lens 11 and fixed relative to an annular shoulder 13 of the housing 10. The dial 12 has imprinted thereon a graduated scale 14, such as a pressure, temperature or vacuum scale, as the case may be. The gage further embodies a movable pointer 15 which coacts with the graduated scale 14 and is pivotally mounted through a sleeve bearing 16 on a shaft 17 of the gage, suitably held within the housing 10. The gage pointer 15 is driven to sweep over the scale 14 by a drive arm 18 on the rotatable sleeve bearing 16, said arm directly connected to the lower end of the pointer 15 and being biased by a torsion spring 19 toward a pointer zeroing position. The pointer 15 is driven to sweep over the scale 14 by a suitable drive means 20 of a conventional type connected with a Bourdon tube and intermediate gearing, not shown, or other conventional means.

Figure 2:
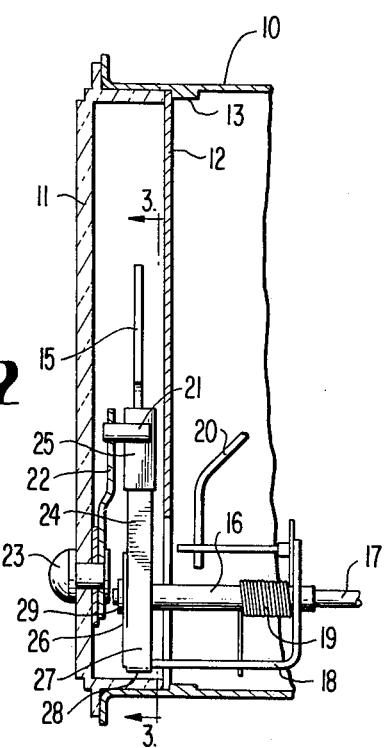
FIG. 2 is a fragmentary vertical section taken through the gage of FIG. 1.

The entire gage structure is conventional and is preferably of the type referred to in U.S. Pat. No. 3,578,931. No purpose would be satisfied by further describing the details of the gage in this application. Gages of the type illustrated are equipped with manually adjustable high or low limit set contacts, or both, and in the present illustration a manually adjustable high limit set contact 21 is illustrated. The set contact 21 is in the form of a cylindrical pin normal to the plane of pointer 15 and in the path of movement thereof, FIG. 2. This high limit set contact 21 is carried by an adjusting arm 22 immediately below the lens 11 and being turnable from the exterior of the gage by a rotary element 23 adapted to receive a turning wrench or the like. The arm 22 is turnable with the element 23 on the axis of a fixed pivot attached to the lens 11, and this structure is also conventional.

The wiping or self-cleaning contact means forming the subject matter of the invention is in the form of a highly resilient spring arm 24 disposed near one side of the pointer 15 and having a gold-flashed silver contact 25 attached to its free end by crimping or soldering. The arm 24 is formed of nickel silver or equivalent material and is attached to an intermediate flat mounting strip 26 of the same material integrally by short side sections 27 disposed at right angles to the mounting strip 26. The mounting strip 26 is clearly shown in FIGS. 1, 2 and 5.

A companion or duplicate spring contact arm 24' is similarly integrally attached to the other side of the central mounting strip 26 and carries another gold-flashed silver contact 25' for coaction with a low limit adjustable set contact, not shown, similar to the high limit contact 21. In this connection, the invention which is an attachment to the movable pointer 15 may be used with either a high or low limit adjustable set contact or with both, depending upon the installation. For simplicity, the invention has been illustrated on a gage having only a high limit set contact 21.

The wiping contact attachment to the pointer 15 further comprises a pair of integral inwardly bent lower end tabs 28 which engage beneath the lower end of the pointer 15 to stabilize the attachment. The spring contact arms 24 and 24' are separated from the central mounting strip 26 except in the regions of the side sections of flanges 27.

Figure 5:
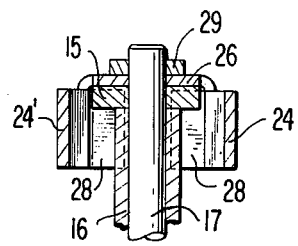
FIG. 5 is a fragmentary vertical section taken substantially on line 5—5 of FIG. 3.

The wiping contact arm attachment, as well as the pointer 15, may be secured to the sleeve bearing 16 by peening or flaring the end of the latter as indicated at 29, or by conventional equivalent means. As best shown in FIG. 5, the pointer attachment is substantially U-shaped in cross section in the region of the side sections or flanges 27.

Figure 3:
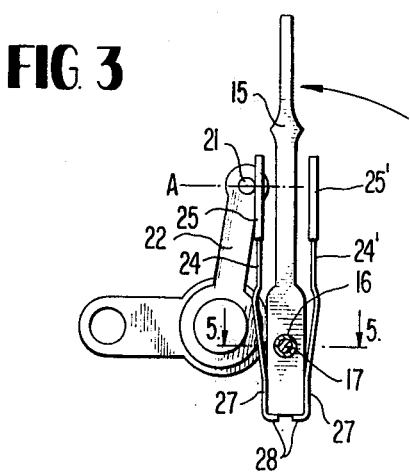
FIG. 3 is a fragmentary vertical section taken on line 3—3 of FIG. 2.
Figure 4:
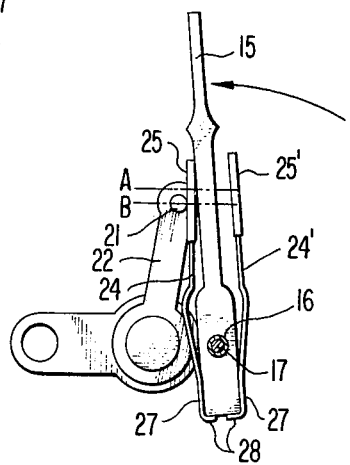
FIG. 4 is a view similar to FIG. 3 illustrating the self-cleaning or wiping action of the pointer-mounted switch contact.

As shwon in FIG. 1, when the pointer 15 is away from the adjustable set contact 21, both spring arms 24 and 24' are relaxed and their wiping contacts 25 and 25' are equally spaced from the pointer 15 and parallel. When the pointer 15 sweeps over the scale 14, its wiping contact 25 will eventually engage the set contact pin 21 at (A), FIG. 3, and further movement of the pointer causes the arm 24 to yield inwardly toward the pointer, FIG. 4, and the wiping engagement of contact 25 with set contact pin 21 will occur between the points (A) and (B) as depicted in FIG. 4. This relatively small sliding or wiping action between the cylindrical contact pin 21 and flat switch contact 25 is sufficient to clean the switch contacts and maintain them free of film or corrosion even in a very corrosive atmosphere. The identical mode of operation and cleaning action takes place at the companion contact 25' in cases where a low limit adjustable set contact is employed on the other side of the pointer 15, and thus the single economical and very lightweight sheet metal attachment for the pointer 15 imparts to the gage an increased ability to be self-cleaning at its switch contacts with maximum versatility and without interfering with the normal operation of the gage or altering its basic construction in any way.

The advantages of the invention will be apparent to those skilled in the art without the necessity for any further description therein.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A wiping contact device suitable for attachment to the pointer support shaft and the movable pointer of gage, said gage having relatively stationary pin contact means mounted thereon, said device comprising a central flat mounting strip portion having an aperture to receive the pointer support shaft, a pair of spaced opposed substantially right angular flanges on said mounting strip portion integrally connected thereto and projecting away from one face thereof whereby said flanges may closely straddle an intervening part of the pointer, a pair of opposing spaced tabs integrally formed on the ends of said flanges adjacent to the mounting strip portion and being substantially at right angles to the flanges whereby the tabs may lap one end of the pointer to stabilize said device, a pair of generally parallel spaced opposed spring contact arms integrally attached to said flanges and extending therefrom in one direction longitudinally of the pointer to which the device is attached, said spring contact arms being unattached to said central mounting strip portion and being freely movable relative thereto, said spring contact arms extending substantially beyond one end of said mounting strip portion which is remote from said tabs, and a pair of flat plate-like wiping contacts secured to opposing free end portions of said spring contact arms and spaced a substantial distance from said aperture of the mounting strip portion, whereby said wiping contacts may individually and indepently wipingly engage the relatively stationary pin contact means disposed in the path of movement of said wiping contacts.

2. A wiping contact device as defined in claim 1, wherein said central mounting strip portion, right angular flanges, tabs and said spring contact arms are formed from a unitary metal body, and said wiping contacts are precious metal contacts attached to said spring contact arms.

* * * * *